April 30, 1929. T. R. TRAINOR 1,711,367

PROCESS OF TREATING BENZOL TO ELIMINATE CORROSIVE PROPERTIES

Filed April 30, 1927

Inventor
Theodore R Trainor
By A. P. Greeley
Attorney

Patented Apr. 30, 1929.

1,711,367

UNITED STATES PATENT OFFICE.

THEODORE R. TRAINOR, OF WILSON, PENNSYLVANIA, ASSIGNOR OF ONE-HALF TO JOSEPH A. KELLY, OF PITTSBURGH, PENNSYLVANIA.

PROCESS OF TREATING BENZOL TO ELIMINATE CORROSIVE PROPERTIES.

Application filed April 30, 1927. Serial No. 187,846.

My invention relates to a process of treating benzol to eliminate corrosive qualities.

The serious objection to the use of benzol in any considerable proportion in motor fuel is that it carries even after being subjected to washing with sulphuric acid and caustic soda, ingredients which tend to corrode the interiors of the engine cylinders. In the effort to eliminate such corrosive substances by washing with sulphuric acid and caustic soda the loss of benzol by evaporation is very great and a considerable proportion of the benzol is carried off with the sludge.

It is the object of my present invention to provide a process by which corrosive substances may be eliminated without loss by evaporation and with practically no loss from being carried off with sludge.

With the object just stated and other objects hereinafter explained in view my invention consists in the process hereinafter described and claimed.

Figure 1:
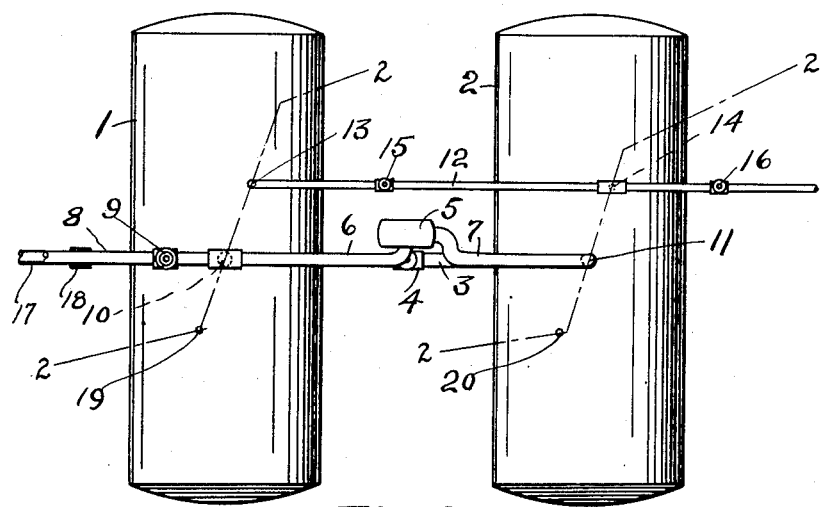
Figure 2:
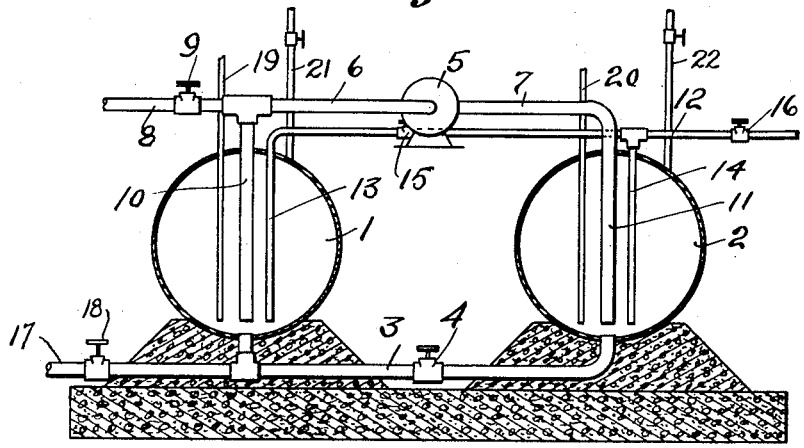

Referring to the drawings which are illustrative only of apparatus which may be used in carrying out my process and are not intended to limit my invention to the use of any particular apparatus, Figure 1 is a top plan view of one form of apparatus adapted to carry out my process, and Figure 2 is a vertical sectional view on line 2—2 of Figure 1.

In the drawings 1 and 2 indicate two closed tanks arranged side by side connected at their lowest points by pipe 3 in which is arranged valve 4. Suitably supported above the level of the tops of the tanks is a pump 5 here shown as a rotary pump, having its inlet connected by pipes 6 and 10 with the lower part of tank 1, the pump having its discharge connected by pipes 7 and 11 with the lower part of tank 2. Pipe 10 is preferably connected at its upper end with pipe 8, with valve 9, which leads from the supply of benzol to be treated. Pipe 12 leads from a supply of the lime solution or soda solution used. Valves 15 and 16 are provided in this alkali supply pipe and pipes 13 and 14 lead from it to near the bottoms of the tanks 1 and 2 respectively. Pipe 17 controlled by valve 18 is connected with pipe 3 and serves to lead off the sediment, and subsequently the purified benzol to suitable tanks or other receptacles. 19 and 20 indicate air pipes extending nearly to the bottoms of the respective tanks through which, if desired, air may be forced in to agitate the contents of the tanks, or to force the contents out of the tanks. 21 and 22 indicate pipes for carrying off air and for agitating.

In carrying out my process I fill the two tanks 1 and 2 nearly full with the benzol to be treated through pipe 8, the benzol delivered to tank 1 through pipe 10 being allowed to pass by pipe 3, valve four being opened, to tank 2. Lime solution (1 percent solution) is added through pipes 12, 13, and 14 in proportion of 500 gallons of the lime solution to 20,000 gallons of benzol. Pump 5 is then started and valve 4 in pipe 3 being opened benzol and lime is drawn from tank 1 and forced into tank 2 from which it flows through pipe 3 to tank 1. This circulation is continued for about one hour. A ten percent solution of sodium bicarbonate is then added in the proportion of 500 gallons of soda solution to the 20,000 gallons of the benzol, and the pump is again operated to circulate the mixture of benzol with the lime and soda solution for about one hour. At the end of an hour the pump is stopped and a sample taken and tested. If the sample is not substantially free from corrosive substances the circulation of the mixture is continued for another hour and if on a further test the benzol is still corrosive the circulation may be continued. As soon as the test of a sample shows the benzol to be substantially non-corrosive the sediment is drawn off through pipe 15 and the clear benzol is then ready to be drawn off for shipment.

If preferred, lime alone may be used for neutralizing the acidity of the crude oil or sodium bicarbonate alone may be used, but I prefer to use lime and sodium bicarbonate as described.

The contents of the tank may be agitated by air under pressure entering through pipes 19 and 20 and escaping by pipes 21 and 22, or the circulating pump with air introduced through pipes 19 and 20 may be used.

Having thus described my invention, what I claim is:

1. The process of treating benzol to eliminate corrosive qualities which consists in adding lime solution to the benzol, forcibly circulating the mixture in a closed system, adding a sodium bicarbonate solution and again circulating the mixture in the closed system.

2. The process of treating benzol to eliminate corrosive qualities which consists in adding a one percent solution of lime, forcibly circulating the mixture in a closed system, adding a ten percent solution of sodium bicarbonate and again forcibly circulating the mixture in the closed system.

In testimony whereof, I hereunto affix my signature.

THEODORE R. TRAINOR.